July 10, 1956        G. W. FEIL, JR        2,754,146
CAB MOUNTING EMPLOYING LEAF SPRINGS
Filed Sept. 29, 1951
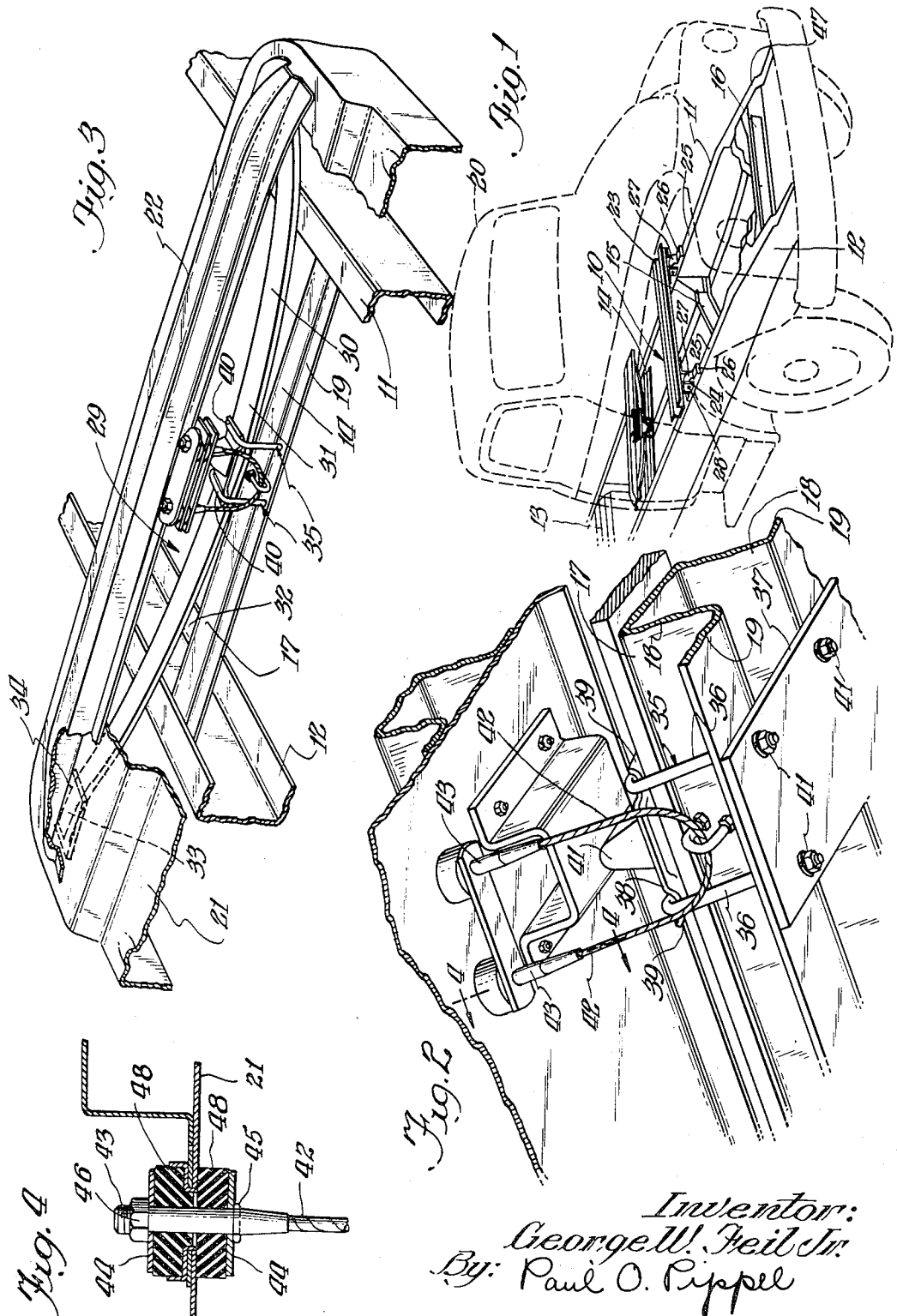
Inventor:
George W. Feil Jr.
By: Paul O. Pippel
Attorney United States Patent Office 2,754,146
Patented July 10, 1956

2,754,146
CAB MOUNTING EMPLOYING LEAF SPRINGS

George W. Feil, Jr., Fort Wayne, Ind., assignor to International Harvester Company, a corporation of New Jersey Application September 29, 1951, Serial No. 248,927

2 Claims. (Cl. 296—35)

This invention relates to the mounting of a body upon a chassis frame of a motor vehicle and more particularly to the novel connections, supports and disposition of the same interposed between the body and chassis frame.

In the operation of a motor vehicle, such as a motor truck, over a comparatively smooth road bed at a particular critical speed, it has been found that the vehicle body is caused to vibrate violently. The vibrations, in many cases, are great enough to break the connections between the vehicle chassis frame and the body and also are a source of discomfort for those riding in the body.

It is fairly well established that the cause of the vibrations is due primarily to the exciting force generated by the unbalanced condition or run out of the ground engaging wheels. In the case of a motor truck, leaf springs are generally interposed between the truck axles and the chassis frame to absorb the exciting force and if ideal springs having no static friction whatsoever were available, the vibrations would not occur. However, conventional leaf springs do have a certain amount of static friction and if the exciting force from the ground engaging wheels is less than the static friction of the leaf springs, the chassis frame and axles will act as though they were connected by a rigid link. Consequently, the amplitude of vibration of the chassis frame will equal the amplitude of the wheels until the exciting force becomes greater than the frictional force.

It has also been determined that upon reaching a certain vehicle speed, a periodic exciting force is transmitted from the wheels to the chassis frame through the leaf springs, causing the frame to resonate in bending. Furthermore, since in the construction of conventional motor trucks, the engine and operator's cab are spaced forwardly of and are secured independently of the load carrying body and the pay load carried thereby which tend to stiffen the rear end of the chassis frame, the disturbance caused by the bending vibration is most pronounced in the vicinity of the rear panel of the operator's cab. It is, therefore, the primary objective of the present invention to provide means for mitigating the damaging effect of the chassis frame vibrations on the vehicle cab by substantially preventing the transmission of the vibratory forces to the rear portion of the vehicle cab.

Another object is to provide a vehicle body mounting structure by virtue of which the torsional forces imposed on the relatively flexible chassis frame by the distortion of the frame side sills as when the vehicle is driven over an uneven terrain or road bed irregularities, causing one or more ground engaging wheels to be elevated differently than the other wheels, are effectively relieved and are transmitted to a lesser degree to the cab than heretofore possible.

A further object is the provision of a three-point mounting structure for vehicle cabs which employs a transversely disposed leaf spring for connecting one end of the body to the chassis frame.

A still further object is to provide a single leaf spring for interconnecting the rear portion of the vehicle cab and the chassis frame to absorb and cushion the shocks and vibrations normally transmitted to the cab at that point.

The foregoing and other important objects and desirable features inherent in and encompassed by the invention together with many of the purposes and uses thereof will become readily apparent from a reading of the ensuing description in conjunction with the annexed drawings, in which:

Fig. 1 is a perspective view of the front end of a motor truck chassis taken from a point disposed angularly above the vehicle; the outline of the vehicle cab being shown with broken lines;

Fig. 2 is an enlarged perspective view, partially in cross-section, looking rearwardly along line 2—2 of Fig. 3 from a point disposed angularly below the right side sill member showing one form of the invention;

Fig. 3 is a perspective view of the form of invention illustrated in Fig. 2 showing a cab mounting structure for supporting the rearwardly disposed end of the cab on the chassis frame; and Fig. 4 is a detailed view taken substantially along line 4—4 of Fig. 2.

Referring to the drawings wherein like reference characters designate like elements throughout the various views, there is shown the forward portion of a conventional truck chassis frame 10. The chassis frame 10 includes a pair of longitudinally extending transversely spaced side sill members 11 and 12 having the usual U-shaped form interconnected by a plurality of longitudinally spaced, transversely disposed cross members 13, 14, 15 and 16. Cross member 14, as best shown in Figs. 2 and 3, has an inverted U-shape section 17, the legs 18 of which are provided with oppositely projecting flanges 19.

The vehicle cab 20, the sheet metal outline of which is shown somewhat diagrammatically with broken lines in Fig. 1, includes a floor panel 21 and a rearward cab cross member 22 longitudinally spaced from a forward cab cross member 23. The forward cab cross member 23 has secured thereto adjacent each end thereof a pair of depending brackets 24. Rigidly fastened to the top flanges 25 of each sill member 11 and 12 are bracket members 26 which are provided with horizontal, transversely extending bearing portions 27. A bolt 28 or other suitable journal means extends through each bearing portion 27 and is fastened to a respective bracket 24 to pivotally connect the forward end of the vehicle cab 20 to the chassis frame 10. A rubber bushing is interposed between the bolt 28 and the bearing portion 27 whereby the bolt 28 is capable of rotating and moving angularly slightly with respect to the bearing portion 27 by deformation of the rubber bushing.

The rearward end of the vehicle cab 20 is resiliently connected to the chassis frame 10 by means of a leaf spring structure designated generally by numeral 29. As best shown in Figs. 2 and 3, the leaf spring structure 29 includes a single arched leaf spring member 30 having its central portion 31 abutting the upper surface 32 of the cross member 14 substantially midway between the side sill members 11 and 12. The ends 33 of the leaf spring member 30 are slightly flattened, as shown in Fig. 3, and are disposed above and outwardly of the side sill members 11 and 12. The flattened ends 33 are adapted to slidingly engage wear plates 34 secured to the underside of the floor panel 21. The central portion 31 of the leaf spring member 30 is rigidly clamped to the cross member 14 by means of a pair of U-bolts 35, the legs 36 of which extend through the flanges 19 and a plate 37 which bridges the flanges and adds rigidity thereto. A seat member 38, mounted on the central portion 31, has spaced channels 39 formed therein for receiving the bight sections 40 of the U-bolts 35. Locking nuts 41 are used to tightly clamp the leaf spring member 30 to the cross member 14.

It will be evident from the above described structure that the rear end of the cab 20 is capable of moving relatively in a vertical direction with respect to the chassis frame 10. Furthermore, the leaf spring member 30 is comparatively "soft" to isolate the cab 20 from the chassis frame 10 and prevent the transmission of vibrations from the chassis frame to the cab. However, supporting the rear end of the cab 20 as described above may allow more relative movement under certain operation conditions than is desired. Hence, to compensate for this eventuality, resilient stop means are provided to positively limit the relative movement. Excessive relative movement in a downward direction is prevented by means of an upwardly projecting pad 41 of resilient cushioning material such as rubber or the like, which is clamped to the central portion 31 of the leaf spring member 30 by seat member 38, coming in contact with a U-shaped abutment member 42 fastened to and depending from the floor panel 21.

A cable 42 having its ends provided with threaded portions 43 is adapted to loosely extend through a U-bolt fastened to the forwardly disposed leg 18 of cross member 14. The threaded end portions 43 extend through the floor panel 21 as well as clamping plates 44 disposed above and below the floor panel. Interposed between each plate 44 and the floor panel 21 is a rubber pad 48. The lower clamping plate 44 is held in position on the threaded portion 43 by a snap ring 45, as best shown in Fig. 4. A lock nut 46 engages each threaded portion 43 to secure the cable ends to the floor panel 17. It will be obvious that upward movement of the rear end of the cab 20 is effectively limited by the cable structure described above.

In normal operation of the truck over a comparatively level and smooth road bed, the chassis frame twist is practically non-existent. The entire weight of the vehicle cab 20 is supported by the bracket members 26 and the leaf spring structure 29 and is maintained in a relatively fixed upright position with respect to the chassis frame 10. Possible damage to and breakage of the sheet metal cab 20 caused by the chassis frame 10 vibrating in resonance is reduced to a minimum. The leaf spring structure 29 which substantially prevents the transmission of the vibratory forces to the cab 20 from the chassis frame 10 by flexing is intentionally positioned at a point along the chassis frame where the vibration amplitude is the greatest.

Operation of the motor truck over an uneven terrain oftentimes results in the twisting of the chassis frame 10 whereby one end of one of the side sill members 11 or 12 is raised with respect to the other side sill member. The cab mounting structure described above effectively accommodates the chassis frame twist without imposing severe damaging strains on the sheet metal parts of the vehicle cab 20. As an example, if the forward end, indicated by numeral 47 of side sill member 11 is suddenly displaced vertically, upwardly with respect to the side sill member 12, the resulting force is not fully transmitted to the vehicle cab 20 to torsionally distort the same. Bracket member 26 attached to sill member 11 and bracket 24 pivotally connected to bracket member 26 are raised a proportionately smaller distance by the displacement of forward end 47 of the sill member 11 since they are spaced rearwardly of the forward end. The cab 20 will tend to pivot about the oppositely disposed bracket member 26 mounted on side sill member 12. The pivotal movement is resiliently resisted by the leaf spring structure 29. It will be obvious that a minimum amount of shock is transmitted to the vehicle cab 10 by mounting the cab as described above. The damaging forces and vibrations are effectively dissipated by the leaf spring structure 29.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a motor vehicle having a longitudinal frame including a pair of side sill members interconnected by a transverse cross member and a body disposed above said frame, said body including a transverse cross member having a length substantially longer than the length of said frame cross member, the combination including said frame and body comprising, means for connecting one end of said body to said frame at a pair of points, said points being transversely spaced from a vertical plane passing through the longitudinal median line of said frame; resilient means for connecting the opposite end of said body to said frame including a transversely disposed leaf spring having its ends engaging respective opposite sides of said body and being in vertical alignment with respective opposite ends of said body cross member, a central section of said leaf spring being connected to a central section of said frame cross member; stop means for limiting relative movement of said body toward said frame including a resilient pad carried by said frame cross member and spaced between said frame cross member and said body; and second stop means for limiting the relative movement of said body away from said frame including a U-bolt secured to said frame cross member and a cable extending through said U-bolt and having its ends resiliently connected to said body, said pad and U-bolt being disposed in the vertical plane passing through the longitudinal median line of said frame.

2. In a motor vehicle having a longitudinal frame including a pair of side sill members interconnected by a transverse cross member and a body disposed above said frame, said body including a transverse cross member, the combination including said frame and body comprising, means for connecting one end of said body to said frame; resilient means for connecting the opposite end of said body to said frame including a transversely disposed leaf spring having its ends abutting the underside of respective opposite sides of said body and being in vertical alignment with respective opposite ends of said body cross member, a central section of said leaf spring being rigidly secured to a central portion of said frame cross member; stop means for limiting relative movement of said body toward said frame including a rubber pad carried by said frame cross member and spaced between said frame cross member and said body; and second stop means for limiting the relative movement of said body away from said frame including a U-bolt secured to said frame cross member and a cable extending through said U-bolt and having its ends resiliently connected to said body, said pad and U-bolt being disposed in a vertical plane passing through the longitudinal median line of said frame.

References Cited in the file of this patent

UNITED STATES PATENTS

| | | |
|---|---|---|
| 320,860 | Esch | June 23, 1885 |
| 914,111 | Buckwalter | Mar. 2, 1909 |
| 962,259 | Rockwell | June 21, 1910 |
| 1,062,872 | Abbot | May 27, 1913 |
| 1,081,346 | Tramel | Dec. 16, 1913 |
| 1,647,084 | Curtis | Oct. 25, 1927 |
| 1,667,204 | Hughes | Apr. 24, 1928 |
| 1,939,155 | Wise | Dec. 12, 1933 |
| 2,138,114 | Nelson | Nov. 29, 1938 |
| 2,301,742 | Muller | Nov. 10, 1942 |
| 2,361,496 | Pointer | Oct. 31, 1944 |

FOREIGN PATENTS

| | | |
|---|---|---|
| 584,293 | Great Britain | Jan. 10, 1947 |
| 616,466 | Great Britain | Jan. 21, 1949 |